(12) United States Patent
Wang et al.

(10) Patent No.: US 7,961,966 B2
(45) Date of Patent: Jun. 14, 2011

(54) DIGITIZED IMAGE STABILIZATION USING ENERGY ANALYSIS METHOD

(75) Inventors: Gyh-Bin Wang, Jung-Li (TW); Wen-Ming Lu, Hsinchu (TW)

(73) Assignee: Etron Technology, Inc., Hsin-Chu (TW)

( * ) Notice: Subject to any disclaimer, the term of this patent is extended or adjusted under 35 U.S.C. 154(b) by 1309 days.

(21) Appl. No.: 11/028,744

(22) Filed: Jan. 4, 2005

(65) Prior Publication Data

US 2006/0146139 A1 Jul. 6, 2006

(51) Int. Cl.
*G06K 9/40* (2006.01)
*G06K 9/00* (2006.01)
*H04N 5/228* (2006.01)

(52) U.S. Cl. .... 382/254; 382/275; 382/167; 348/208.99

(58) Field of Classification Search .................. 382/254; 348/208.99
See application file for complete search history.

(56) References Cited

U.S. PATENT DOCUMENTS

| | | | | |
|---|---|---|---|---|
| 3,993,862 A * | 11/1976 | Karr | .......... | 358/426.01 |
| 4,305,091 A * | 12/1981 | Cooper | .......... | 348/619 |
| 4,573,070 A * | 2/1986 | Cooper | .......... | 348/617 |
| 4,864,590 A * | 9/1989 | Arnon et al. | .......... | 375/233 |
| 5,170,264 A * | 12/1992 | Saito et al. | .......... | 382/239 |
| 5,418,574 A * | 5/1995 | Miyabata et al. | .......... | 348/625 |
| 5,481,628 A * | 1/1996 | Ghaderi | .......... | 382/261 |
| 5,552,832 A * | 9/1996 | Astle | .......... | 375/240.24 |
| 5,629,988 A | 5/1997 | Burt et al. | .......... | 382/276 |
| 5,768,442 A * | 6/1998 | Ahn | .......... | 382/274 |
| 6,233,009 B1 * | 5/2001 | Morofuji et al. | .......... | 348/208.8 |
| 6,262,809 B1 * | 7/2001 | Itoh et al. | .......... | 358/1.9 |
| 6,317,114 B1 | 11/2001 | Abali et al. | .......... | 345/121 |
| 6,377,642 B1 * | 4/2002 | Dollard | .......... | 375/355 |
| 6,473,131 B1 * | 10/2002 | Neugebauer et al. | .......... | 348/572 |
| 6,560,375 B1 | 5/2003 | Hathaway et al. | .......... | 382/295 |
| 6,633,683 B1 * | 10/2003 | Dinh et al. | .......... | 382/260 |
| 6,850,573 B1 * | 2/2005 | Noda | .......... | 375/262 |
| 6,862,372 B2 * | 3/2005 | Yang et al. | .......... | 382/254 |
| 6,877,117 B1 * | 4/2005 | Childers et al. | .......... | 714/704 |
| 7,031,393 B2 * | 4/2006 | Kondo et al. | .......... | 375/240.29 |
| 7,031,543 B2 * | 4/2006 | Cheng et al. | .......... | 382/254 |
| 7,031,552 B2 * | 4/2006 | Kim | .......... | 382/275 |
| 7,127,122 B2 * | 10/2006 | Ogata et al. | .......... | 382/260 |
| RE39,985 E * | 1/2008 | Tatsuta | .......... | 382/270 |
| 7,409,030 B2 * | 8/2008 | Cheng | .......... | 375/376 |
| 7,474,785 B2 * | 1/2009 | Wu et al. | .......... | 382/168 |
| 7,609,795 B2 * | 10/2009 | Huang et al. | .......... | 375/355 |
| 7,636,493 B2 * | 12/2009 | Sakaguchi et al. | .......... | 382/274 |
| 7,660,376 B2 * | 2/2010 | Wang | .......... | 375/354 |
| 7,729,555 B2 * | 6/2010 | Chen et al. | .......... | 382/261 |
| 7,835,465 B1 * | 11/2010 | Hu et al. | .......... | 375/316 |

(Continued)

*Primary Examiner* — Vikkram Bali
*Assistant Examiner* — Michelle Entezari
(74) *Attorney, Agent, or Firm* — Saile Ackerman LLC; Stephen B. Ackerman

(57) ABSTRACT

A method and an apparatus are provided for image stabilization for the output of analog-to-digital converters (ADC) and for phase-locked loops (PLL). The digital coding at the output of ADCs and PLLs is filtered by this method and apparatus to eliminate the noise which has contaminated the coding. The noise sources are noise picked up by the cable, system board noise, ADC power and ground noise paths, and switching noise. The differences of energy level of sequential pixels in the ADC and PLL digital outputs used in image displays are used to decide if correction is required. The method of image noise filtering is compatible with programmable circuitry. This allows the method to be tuned for optimal image stabilization.

34 Claims, 5 Drawing Sheets

U.S. PATENT DOCUMENTS

| | | |
|---|---|---|
| 2001/0028746 A1* | 10/2001 | Kennedy et al. ............... 382/238 |
| 2003/0090593 A1* | 5/2003 | Xiong ........................... 348/620 |
| 2003/0190086 A1* | 10/2003 | Kim ............................... 382/275 |
| 2004/0012721 A1* | 1/2004 | Alvarez ......................... 348/618 |
| 2004/0174350 A1* | 9/2004 | Wang ............................ 345/204 |
| 2005/0243213 A1* | 11/2005 | Alvarez ......................... 348/618 |
| 2006/0056722 A1* | 3/2006 | Moroney ....................... 382/266 |
| 2007/0195199 A1* | 8/2007 | Chen et al. .................... 348/607 |
| 2008/0043124 A1* | 2/2008 | Subbotin ....................... 348/250 |
| 2008/0158396 A1* | 7/2008 | Fainstain et al. .............. 348/246 |
| 2009/0091661 A1* | 4/2009 | Wu et al. ....................... 348/687 |
| 2010/0110222 A1* | 5/2010 | Smith et al. ................. 348/222.1 |

* cited by examiner

FIG. 1a - Prior Art

DIGITIZED IMAGE STABILIZATION USING ENERGY ANALYSIS METHOD

BACKGROUND OF THE INVENTION

1. Field of the Invention

The present invention generally relates to filtering noise effects out of digital signals using energy analysis of the digital coding. More particularly, this invention relates to a method for image stabilization for the output of analog-to-digital converters and for phase-locked loops.

2. Description of the Prior Art

Display images today often need stabilization and correction. Typically, this stabilization is required because of moving subjects or moving cameras. Without correction, the unstable images will be "fuzzy" or "blurred". There are several techniques available in today's art. They include subdividing the image into nested pixel blocks in order to determine the overall image change in magnification, rotation, and translation. This determined change could then be used to correct the overall image. Another technique uses a sensor to detect the amount of movement of a display device and a correction circuit. Another technique uses displacement estimation and a feedback loop to achieve image alignment.

FIG. 1a shows an image display 11 with example pixels, x1, x2, x3, . . . , xn. In today's image processors, these individual pixels are normally processed using analog-to-digital converters (ADC) and phase-locked loops (PLL). Today's art typically does not address the image correction from the ADC and PLL circuit level.

- U.S. Pat. No. 6,560,375 (Hathaway, et al.) describes a method of stabilizing and registering a video image in multiple video fields of a video sequence which provides accurate determination of the image change in magnification, rotation and translation between video fields, so that the video fields may be accurately corrected for these changes in the image in the video sequence. A key area of a video field is selected which contains an image which it is desired to stabilize in a video sequence. The area is subdivided into nested pixel blocks and the translation of each of the pixel blocks from the video field to a new video field is determined as a precursor to determining change in magnification, rotation and translation of the image from the key video field to the new video field.
- U.S. Pat. No. 6,317,114 (Abali, et al.) discloses an image stabilizing apparatus and method for a display device having a display screen, include a sensor for sensing a movement of the display device, and a movement compensation circuit, coupled to the sensor, for compensating for the movement of the display device such that an image on the display screen of the display device remains stationary in relation to an observer's view.
- U.S. Pat. No. 5,629,988 (Burt, et al.) describes a system and method for electronic stabilization of an image produced by an electronic imaging device. The input may be any sequence of image frames from an image source, such as a video camera, an IR or X-ray imager, radar, or from a storage medium such as computer disk memory, videotape or a computer graphics generator. The invention can also be used with images from multiple sources when these must be stabilized with respect to one another. The invention uses a feedback loop and second image warp stage to achieve precise image alignment as part of the displacement estimation process.

SUMMARY OF THE INVENTION

It is therefore an object of the present invention to provide a method and an apparatus for image stabilization for the output of analog-to-digital converters and for phase-locked loops.

The objects of this invention are achieved by a method of digitized image stabilization using energy analysis noise correction for analog-to digital converters (ADC). The method comprises the steps of determining if a given image pixels' digital coding is not between the digital coding of its 2 adjacent pixels, and determining if differences between a given image pixel's digital coding's absolute value and its two adjacent pixel's digital coding is less than a pre-determined threshold value. The image pixel's digital coding is determined to not be between said coding of its two adjacent pixels in a monotonically increasing mode if the difference between a digital coding of a left-most adjacent pixel and the given image pixel is positive, and if the difference between the digital coding of the right-most adjacent pixel and the given image pixel is positive. The image pixel's digital coding is determined to not be between said coding of its two adjacent pixels in a monotonically decreasing mode if the difference between a digital coding of the left-most adjacent pixel and said given image pixel is negative, and if the difference between the digital coding of the right-most adjacent pixel and said given image pixel is negative. If it has been determined that both a given image pixel's digital coding is not between the digital coding of its 2 adjacent pixels and a difference between given image pixel's digital coding's absolute value and its two adjacent pixel's digital coding is less than a pre-determined threshold value, than the digital coding of the given image pixel is changed to an average of the digital coding of the two adjacent pixels.

The objects of this invention are also achieved by a method of digitized image stabilization using energy analysis noise correction for phase-locked loops (PLL). The method comprises the steps of selecting an odd number, n, consecutive pixel samples which include a given image pixel, (n−1)/2 consecutive image pixels which are adjacent on the left to said given image pixel, and (n−1)/2 consecutive image pixels which are adjacent on the right to said given image pixel. The method also comprises computing the (n−1) differences between digital codings of said n consecutive pixel samples, adding said n−1 differences between said digital codings of said n consecutive pixel samples to produce a total energy, and choosing a programmable, threshold for the summation of said 4 differences between said digital codings of said n consecutive pixel samples. The method also comprises comparing said total energy to said threshold, deciding if said total energy is greater than said threshold, and changing said digital coding of said given image pixel if said energy is greater than said threshold.

The above and other objects, features and advantages of the present invention will be better understood from the following detailed description taken in conjunction with the accompanying drawings.

BRIEF DESCRIPTION OF THE DRAWINGS

FIG. 1a is a prior art view of an image display.

DESCRIPTION OF THE PREFERRED EMBODIMENT

Figure 1B:
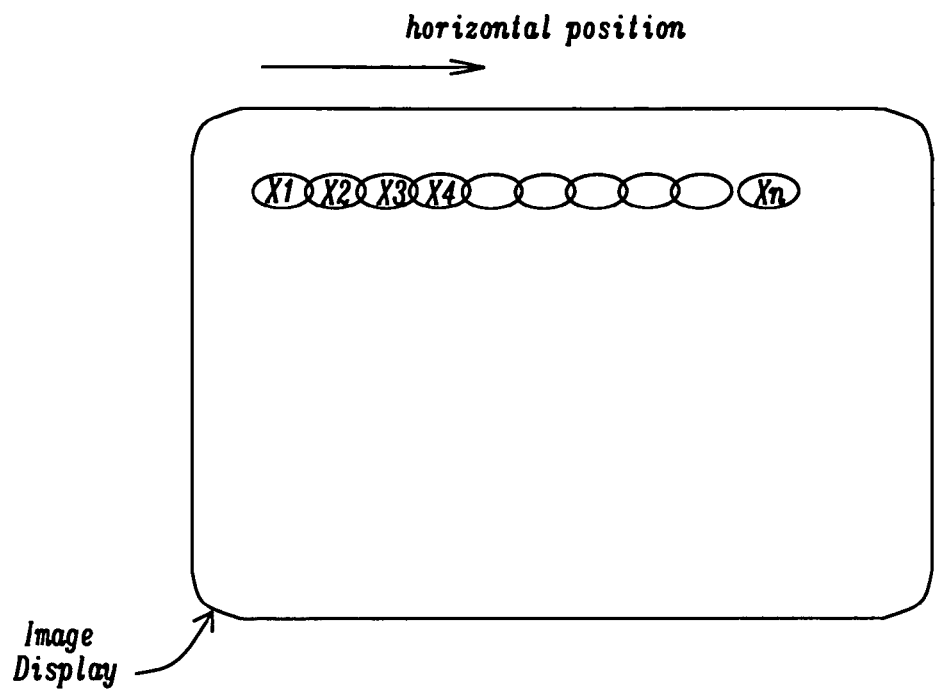
FIG. 1b shows an analog-to-digital converter with the noise reduction apparatus of this invention.
Figure 1B:
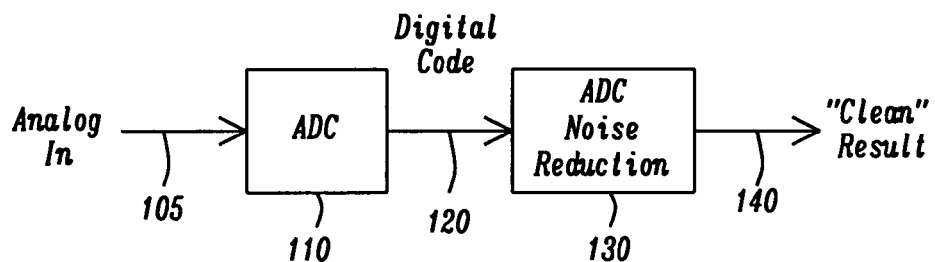

FIG. 1b shows a block diagram of an analog signal 105 which is converted to digital form using analog-to-digital converter, ADC 110. The output of the ADC consists of digital code 120. This digital code has noise components which need to be removed. The noise components are cable noise, system board noise, ADC power and ground noise paths, and switching noise. The ADC noise reduction block 130 is the location of the apparatus of this invention. The output 140 of the ADC noise reduction block is a "clean result" with minimal noise.

Figure 1C:
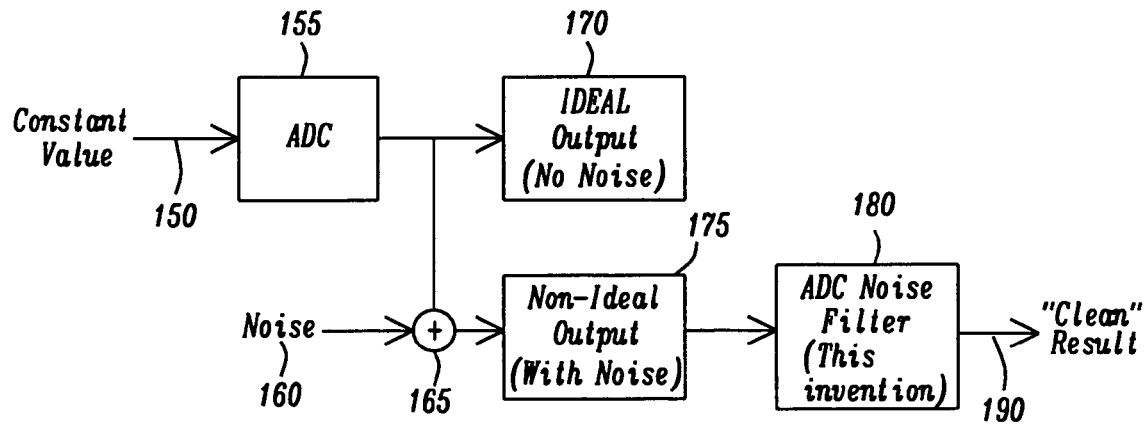
FIG. 1c shows a model of the noise reduction apparatus of this invention.

FIG. 1c is a modeling block diagram. It shows a constant input value 150. This constant or DC value goes into the ADC 155. Since the input is a DC value without noise, the ADC output is an Ideal output 170 without noise. A noise source 160 is injected or added to the ADC clean output at 165. The non-ideal digital output with noise is shown 175. The ADC noise filter 180 of this invention removes the injected noise 160 to produce clean result 190.

Figure 2A:
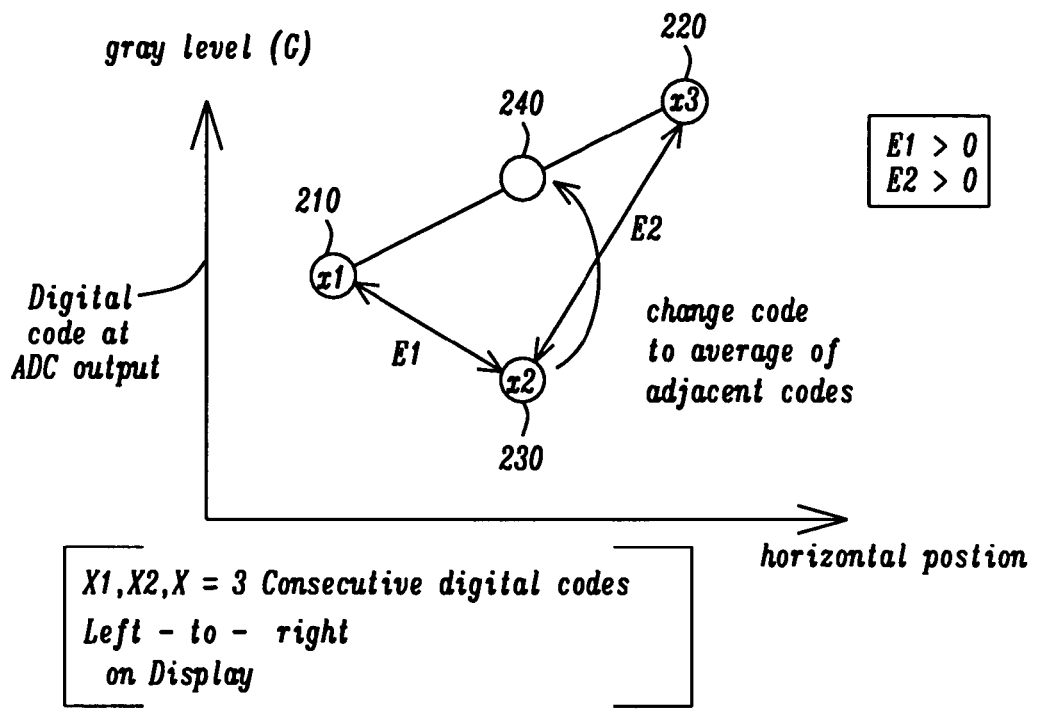
FIG. 2a shows an energy analysis method for the output of an ADC to correct a pixel's digital coding upward toward more energy.

There are digital codes produced by an ADC for each of the display image pixels displayed horizontally from left to right on a display. FIG. 2a shows a plot of digital values versus horizontal position on a display screen. At horizontal position 1, there is a digital code of X1 (210). At horizontal position 2, there is a digital code X2 (230). Code X2 (230) appeared at the output of the ADC block 130 in FIG. 1a. The "gray" X2 code 240 is the adjusted code, which resulted from going through the apparatus of this invention block 130 shown in FIG. 1a. This "new" X2 (240) code is a result of averaging the adjacent codes X1 (210) and X2 (220). X1, X2, and X3 represent 3 consecutive digital codes representing 3 consecutive pixels displayed horizontally on a display. The equations for the averaging example shown in FIG. 2a are as follows.

Define $E1 = G(x1) - G(x2)$
$E2 = G(x3) - G(x2)$
If $E1 > 0$, $E2 > 0$, $E1 <$ Ethreshold, and $E2 <$ Ethreshold, then $G(x2) = [G(x1) + G(x3)]/2$ as in FIG. 2a.

As seen in the equations above, energy values E1 and E2 are defined based on the differences of the absolute values of the digital codings of horizontal pixels 1 and 2 and of the differences of the absolute values of the digital codings of horizontal pixels 3 and 2. The equations above say that if E1 and E2 are positive and if E1 and E2 are both less than some threshold, the digital coding of the middle pixel, x2 is replaced by the average of the digital coding of x1 and x3. If E1 and E2 are not less than the threshold, there is no correction, since the coding of pixel x2 is probably valid. Also, if both E1 and E2 are not greater than 0, the pixels are lined up as in either FIG. 2c or FIG. 2d and no correction is required. The example of FIG. 2a is the case where the "new" X2 (240) code resulting from ADC correction is more "white" with a higher value than the original X2 code 230.

Figure 2B:
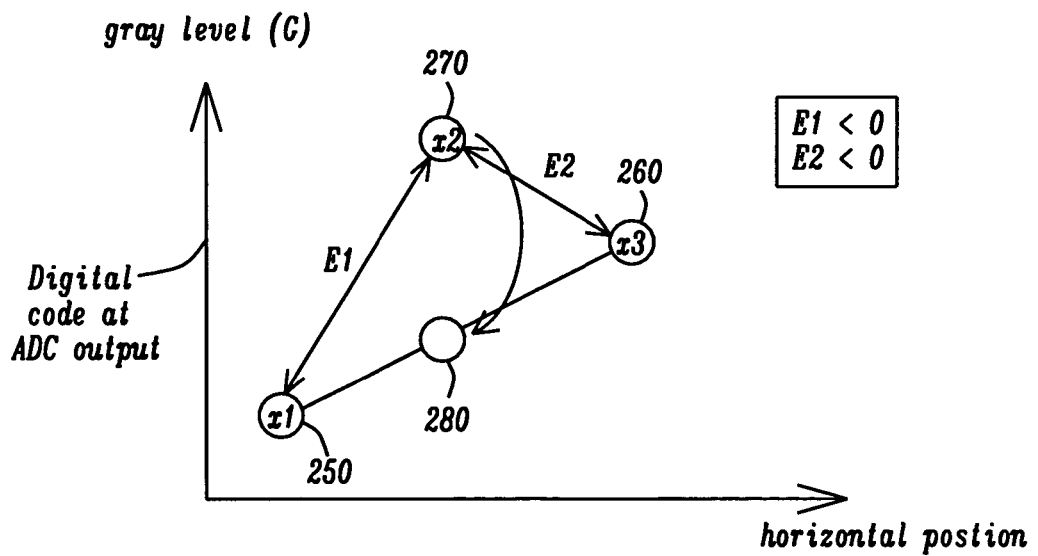
FIG. 2b shows an energy analysis method for the output of an ADC to correct a pixel's digital coding downward toward less energy.
Figure 2C:
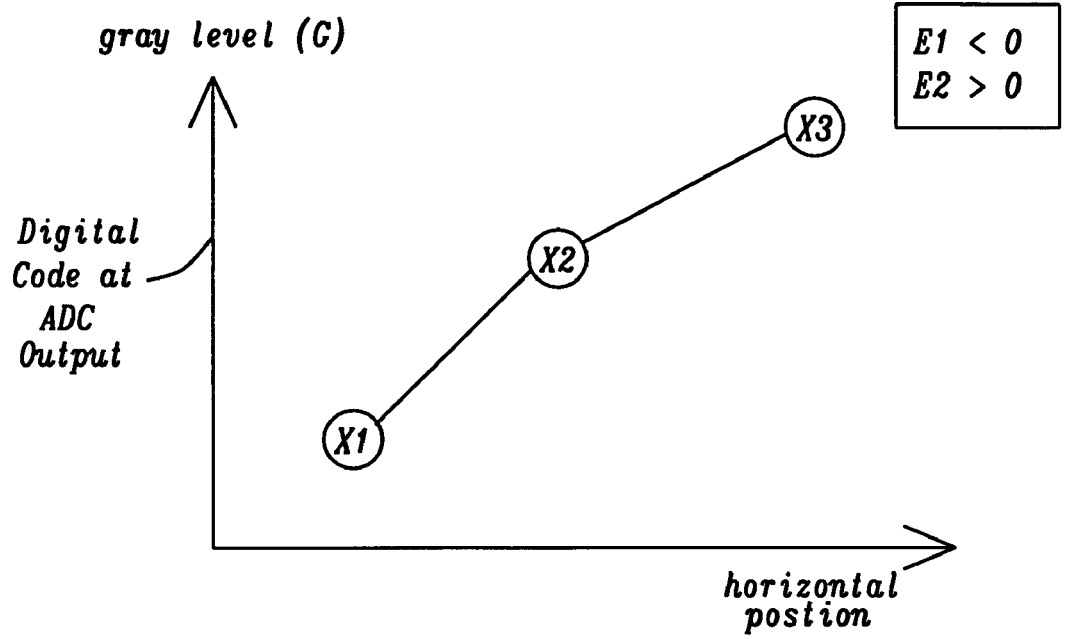
FIG. 2c shows an energy analysis method for the output of an ADC which is monotonically increasing and which does not qualify for correction.
Figure 2D:
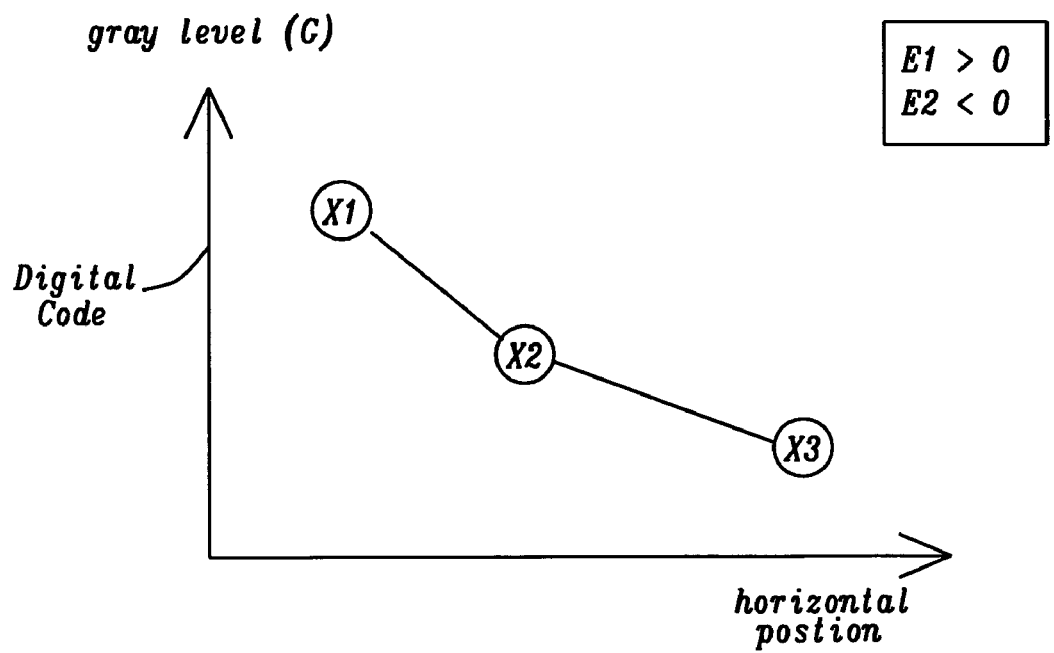
FIG. 2d shows an energy analysis method for the output of an ADC which is monotonically decreasing and which does not qualify for correction.

FIG. 2b shows a plot of digital values versus horizontal position on a display screen. At horizontal position 1, there is a digital code of X1 (250). At horizontal position 2, there is a digital code X2 (270). Code X2 (270) appeared at the output of the ADC block 130 in FIG. 1a. The "gray" X2 code 280 is the adjusted code, which resulted from going through the apparatus of this invention block 130 shown in FIG. 1a. This "new" X2 (280) code is a result of averaging the adjacent codes X1 (250) and X2 (260). X1, X2, and X3 represent 3 consecutive digital codes representing 3 consecutive pixels displayed horizontally on a display. The equations for the averaging example shown in FIG. 2b are as follows.

Define $E1 = G(x1) - G(x2)$
$E2 = G(x3) - G(x2)$
If $E1 < 0$, $E2 < 0$, (absolute value E1) $<$ Ethreshold, & (absolute value E2) $<$ Ethreshold,
then $G(x2) = [G(x1) + G(x3)]/2$ as in FIG. 2b.

As seen in the equations above, energy values E1 and E2 are defined based on the differences of the absolute values of the digital codings of horizontal pixels 1 and 2 and of the differences of the absolute values of the digital codings of horizontal pixels 3 and 2. The equations above say that if E1 and E2 are positive and if E1 and E2 are both less than some threshold, the digital coding of the middle pixel, x2 is replaced by the average of the digital coding of x1 and x3. If E1 and E2 are not less than the threshold, there is no correction, since the coding of pixel x2 is probably valid. Also, if both E1 and E2 are not greater than 0, the pixels are lined up as in either FIG. 2c or FIG. 2d and no correction is required. The example of FIG. 2b is the case where the "new" X2 (280) code resulting from ADC correction is more "white" with a higher value than the original X2 code 270.

Figure 3A:
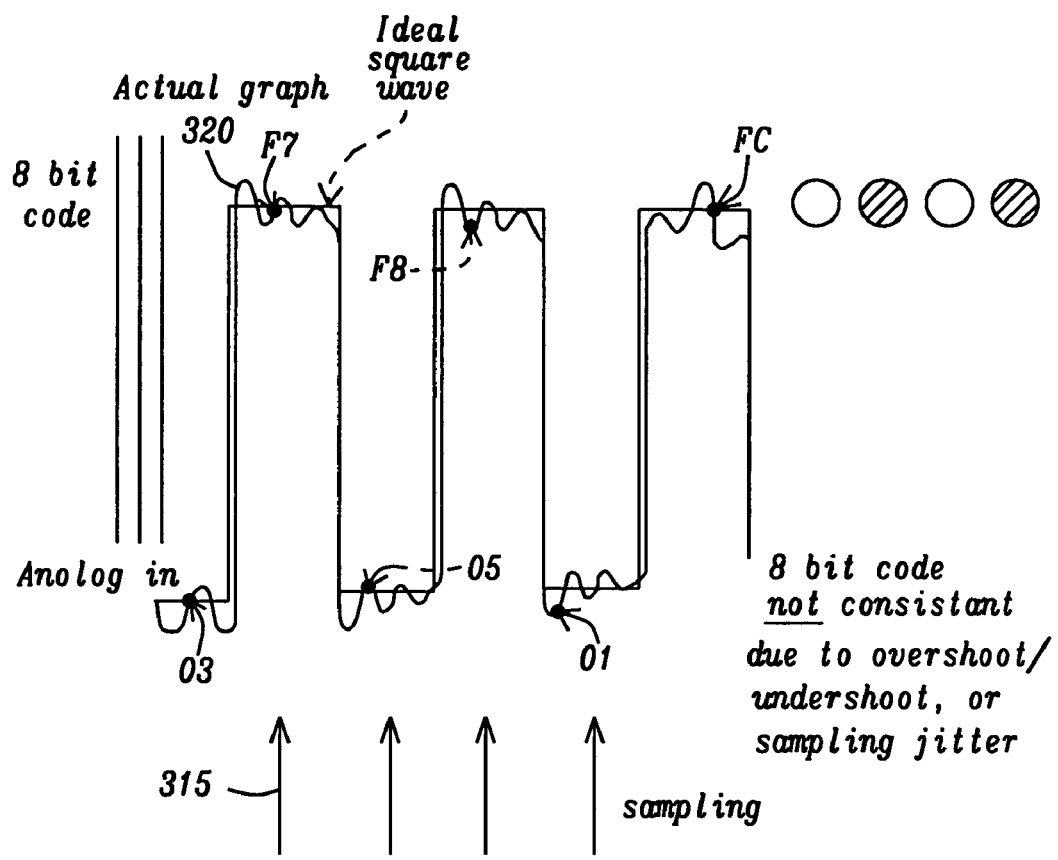
FIG. 3a shows a square wave output of a phase-locked loop which has inconsistent digital coding.

FIG. 3a shows the second or Phase Locked Loop (PLL) embodiment of this invention. FIG. 3a shows an ideal PLL input analog waveform 310. The sampling signals are shown 315. The actual PLL input, analog waveform is shown 320. The actual waveform has overshoots, undershoots, and sampling jitter. These irregularities cause the 8 bit digital code developed by digital sampling to be inconsistent.

The 8-bit digital code for the sampling of the graph in FIG. 3a is shown. For example, the first high level sample shown has a digital value of 'F9' or (1111-1001). The second high level sample shown has a digital value of 'F8'. The third high level sample shown has a digital value of 'FC'. All three high level samples yield different digital codings. This makes for an inconsistent digital representation coming out of the PLL. In addition, the first low-level sample shown has a digital value of '03' or (0000-0011). The second low level sample shown has a digital value of 05. The third low level sample shown has a digital value of low 01. All three level samples yield different digital codings. This results in inconsistent digital representations coming out of the PLL.

Figure 3B:
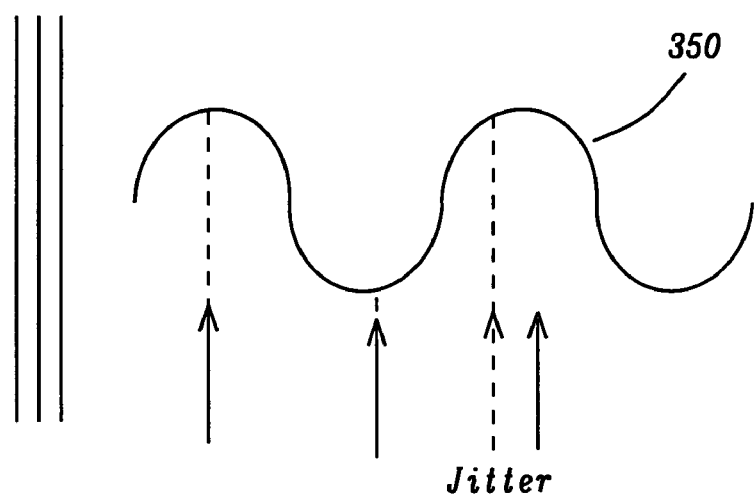
FIG. 3b shows a sine wave output of a phase-locked loop which has inconsistent digital coding.

Similarly, FIG. 3b shows a sine wave instead of the square wave 350 shown in FIG. 3a. In the example of FIG. 3b, the effects of jitter on the sampling position causes inconsistent digital codings. This sampling jitter can result in inconsistent and non-repeatable digital codings for the same waveform as shown in FIG. 3b.

Figure 4A:
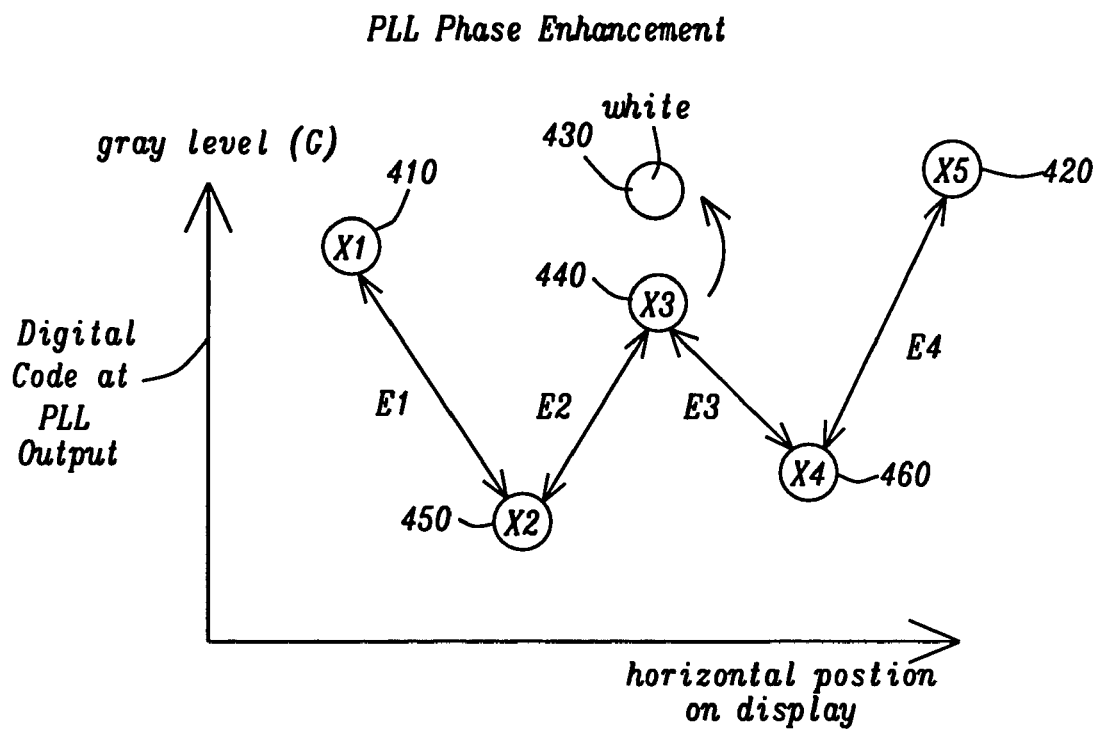
FIG. 4a shows an energy analysis method for the output of a PLL to correct a pixel's digital coding upward toward more energy.

FIG. 4a shows a plot of energy level or gray level (G) versus the left-to-right horizontal position of a pixel on a display. At horizontal position 1, there is a digital code of X1 (410). At horizontal position 2, there is a digital code X2 (450). At horizontal position 3, there is a digital code X3 (440). At horizontal position 4, there is a digital code X4 (460). At horizontal position 5, there is a digital code X5 (420). The "gray" X3 code 430 is the adjusted code, which resulted from going through the apparatus of this invention. This "new" X3 code is a result of averaging the adjacent codes X1 (410) and X5 (420). This new X3 code is more "white" or higher up on the gray scale, as shown in FIG. 4a. This "white" example shown in FIG. 4a represents the case of 5 consecutive horizontal pixel samples. The reason for 5 consecutive pixel samples is to utilize an even number of transitions (4) in order to catch the Moiré pattern. A Moiré pattern of pixels are alternating white and black spots on the display. If more than 5 consecutive pixel samples are used, more hardware would be needed to implement the apparatus of this invention. Therefore, 5 consecutive horizontal pixel samples is optimum. The equation for the "white" example shown in FIG. 4a is given below.

---

Define:  E1 = absolute value of [G(x1) − G(x2)]
E2 = absolute value of [G(x2) − G(x3)]
E3 = absolute value of [G(x3) − G(x4)]
E4 = absolute value of [G(x4) − G(x5)]
Energy = E1 + E2 + E3 + E4
If Energy > threshold (programmable), then
G(x3) will be changed to "white value" (programmable),
if G(x3) > 128

---

Figure 4B:
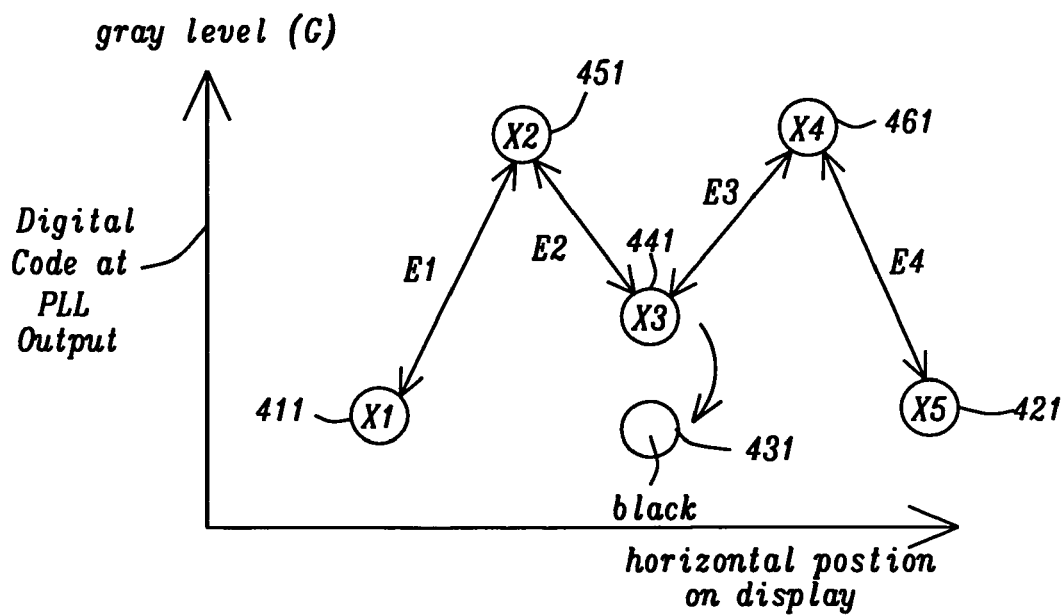
FIG. 4b shows an energy analysis method for the output of a PLL to correct a pixel's digital coding downward toward less energy.

FIG. 4b shows a plot of energy level or gray level (G) versus the left-to-right horizontal position of a pixel on a display. At horizontal position 1, there is a digital code of X1 (411). At horizontal position 2, there is a digital code X2 (451). At horizontal position 3, there is a digital code X3 (441). At horizontal position 4, there is a digital code X4 (461). At horizontal position 5, there is a digital code X5 (421). The "gray" X3 code 431 is the adjusted code, which resulted from going through the apparatus of this invention. This "new" X3 code is a result of averaging the adjacent codes X1 (411) and X5 (421). This new X3 code is more "black" or lower down on the grey scale, as shown in FIG. 4b. This "black" example shown in FIG. 4b represents the case of 5 consecutive horizontal pixel samples. The reason for 5 consecutive pixel samples is to utilize an even number of transitions (4) in order to catch the Moiré pattern. A Moiré pattern of pixels are alternating white and black spots on the display. If more than 5 consecutive pixel samples are used, more hardware would be needed to implement the apparatus of this invention. Therefore, 5 consecutive horizontal pixel samples is optimum. The equation for the "black" example shown in FIG. 4b is given below.

---

Define:  E1 = absolute value of [G(x1) − G(x2)]
E2 = absolute value of [G(x2) − G(x3)]
E3 = absolute value of [G(x3) − G(x4)]
E4 = absolute value of [G(x4) − G(x5)]
Energy = E1 + E2 + E3 + E4
If Energy > threshold (programmable), then
G(x3) will be changed to "black value" (programmable),
if G(x3) < 128.

---

The advantage of this invention is the unique energy analysis method of image stabilization and correction. The energy of image pixels are represented by the absolute values of the digital coding coming out of an analog-to-digital converter or out of a phase-locked loop. Since the invention involves comparing digital codes and digital thresholds, the method is programmable and is amenable to be implemented via digital circuitry and processors.

While the invention has been described in terms of the preferred embodiments, those skilled in the art will recognize that various changes in form and details may be made without departing from the spirit and scope of the invention.

What is claimed is:

1. A method of digitized image stabilization using energy analysis noise correction for analog-to-digital converters (ADC) comprising the steps of:
determining if a given image pixels' digital coding is not between the digital coding of its 2 adjacent pixels, determining if the absolute value of differences between a given image pixels digital coding and its two adjacent pixel's digital coding is less than a pre-determined threshold value, and using said image pixels' digital coding and said absolute value of differences to select which pixels result in a stable image wherein said image is stabilized by calculating an optimum luminance using averaging and differences of light energy coding-
wherein G(x1), G(x2), and G(x3) are digital codings of 3 consecutive pixels x1, x2, x3,
wherein energy values, E1 and E2 are defined as
E1=G(x1)−G(x2)
E2−G(x3)−G(x2) and wherein
Ethreshold is a variable threshold chosen to optimize image stabilization, and wherein,
If E1>0, E2>0, E1<Ethreshold, and E2<Ethreshold, then G(x2)=[G(x1)+G(x3)]/2.

2. The method of digitized image stabilization using energy analysis of claim 1 wherein said image pixel's digital coding is determined to not be between said coding of its two adjacent pixels in a monotonically increasing mode if the difference between a digital coding of a left-most adjacent pixel and said given image pixel is positive, and if the difference between the digital coding of the right-most adjacent pixel and said given image pixel is positive.

3. The method of digitized image stabilization using energy analysis of claim 1 wherein said image pixel's digital coding is determined to not be between said coding of its two adjacent pixels in a monotonically decreasing mode if the difference between a digital coding of the left-most adjacent pixel and said given image pixel is negative, and if the difference between the digital coding of the right-most adjacent pixel and said given image pixel is negative.

4. The method of digitized image stabilization using energy analysis of claim 1 wherein said difference between said given image pixel's digital coding's absolute value and its two adjacent pixel's digital coding's absolute value is determined for possible digital coding correction, if said difference between said digital coding of said left-most adjacent pixel and said given pixel is less than said pre-determined threshold value, and if said difference between said digital coding of said right-most adjacent pixel and said given pixel is less than said pre-determined threshold value.

5. The method of digitized image stabilization using energy analysis of claim 1 wherein if it has been determined that both a given image pixel's digital coding is not between the digital coding of its 2 adjacent pixels and a difference between given image pixel's digital coding's absolute value and its two adjacent pixel's digital coding is less than a pre-determined threshold value, then said digital coding of said given image pixel is changed to an average of said digital coding of said two adjacent pixels.

6. The method of digitized image stabilization using energy analysis of claim 1 wherein if it has been determined that a given image pixel's digital coding is not between the digital coding of its 2 adjacent pixels, and a difference between given image pixel's digital coding's absolute value and its two adjacent pixel's digital coding is less than a pre-determined threshold value, then the digital coding of said given pixel is not changed and is kept to the original digital coding of said given image pixel.

7. The method of digitized image stabilization using energy analysis of claim 1 wherein said pre-determined threshold value is set to two or three least significant bits, in order to filter out ADC noise.

8. A method of digitized image stabilization using energy analysis noise correction for phase-locked-loops (PLL) comprising the steps of:
   selecting an odd number, n, consecutive pixel samples which include a given image pixel, (n−1)/2 consecutive image pixels which are adjacent on the left to said given image pixel, and (n−1)/2 consecutive image pixels which are adjacent on the right to said given image pixel,
   computing the n−1 differences between digital codings of said n consecutive pixel samples, adding said n−1 differences between said digital codings of said n consecutive pixel samples, to produce a total energy,
   choosing a programmable, threshold for the summation of said n−1 differences between said digital codings of said n consecutive pixel samples,
   comparing said total energy to said threshold,
   deciding if said total energy is greater than said threshold, and
   changing said digital coding of said given image pixel if said energy is greater than said threshold, resulting in a stable image.

9. The method of digitized image stabilization using energy analysis noise correction for phase-locked loops (PLL) of claim 8 wherein said samples are chosen to provide an even number of transitions.

10. The method of digitized image stabilization using energy analysis noise correction for phase-locked loops (PLL) of claim 8 wherein said 'n' consecutive pixel samples are chosen to be five to balance hardware complexity and effectiveness in representing alternating black and white images.

11. The method of digitized image stabilization using energy analysis noise correction for phase-locked loops (PLL) of claim 8 wherein said (n−1) differences between digital codings of said n consecutive pixel samples are computed by subtracting a digital coding of a second pixel from a digital coding of a first pixel and a digital coding of a third pixel from said digital coding of said second pixel, wherein generally a digital coding of an x+1 pixel is subtracted from a digital coding of an x pixel, where x=1, 2, 3, . . . n.

12. The method of digitized image stabilization using energy analysis noise correction for phase-locked loops (PLL) of claim 11 wherein said n−1 differences between said digital codings are added to produce a total energy value.

13. The method of digitized image stabilization using energy analysis noise correction for phase-locked loops (PLL) of claim 8 wherein said programmable threshold is chosen to distinguish smooth low contrast images from high contrast images such as alternating black and white images.

14. The method of digitized image stabilization using energy analysis noise correction for phase-locked loops (PLL) of claim 12 wherein said total energy value is compared to said programmable threshold.

15. The method of digitized image stabilization using energy analysis noise correction for phase-locked loops (PLL) of claim 14 where if said total energy value is greater than said programmable threshold, a "change pixel coding flag is set.

16. The method of digitized image stabilization using energy analysis noise correction for phase-locked loops (PLL) of claim 15 wherein if said change pixel coding flag is set, said digital coding of said given image pixel is changed to a white value if said digital coding of said given image pixel is greater than a white threshold.

17. The method of digitized image stabilization using energy analysis noise correction for phase-locked loops (PLL) of claim 16 wherein if said change pixel coding flag is set, said digital coding of said given image pixel is changed to a black value if said digital coding of said given image pixel is less than said white threshold.

18. An apparatus for digitized image stabilization using energy analysis noise correction for analog-to digital converters (ADC) comprising:
   a means for determining if a given image pixels' digital coding is not between the digital coding of its 2 adjacent pixels, a means for determining if the absolute value of differences between a given image pixel's digital coding and its two adjacent pixels digital coding is less than a pre-determined threshold value, and
   a means for using said image pixels' digital coding and said absolute value of differences to select which pixels result in a stable image, wherein said image is stabilized by calculating an optimum luminance using averaging and differences of light energy coding-
   wherein $G(x1)$, $G(x2)$, and $G(x3)$ are digital codings of 3 consecutive pixels x1, x2, x3,
   wherein energy values, E1 and E2 are defined as
   $E1=G(x1)-(x2)$
   $E2-G(x3)-G(x2)$ and wherein
   Ethreshold is a variable threshold chosen to optimize image stabilization, and wherein,
   If $E1>0$, $E2>0$, $E1<Ethreshold$, and $E2<Ethreshold$, then $G(x2)=[G(x1)+G(x3)]/2$.

19. The apparatus for digitized image stabilization using energy analysis of claim 18 wherein said image pixel's digital coding is determined to not be between said coding of its two adjacent pixels in a monotonically increasing mode if the difference between a digital coding of a left-most adjacent pixel and said given image pixel is positive, and if the difference between the digital coding of the right-most adjacent pixel and said given image pixel is positive.

20. The apparatus for digitized image stabilization using energy analysis of claim 18 wherein said image pixel's digital coding is determined to not be between said coding of its two adjacent pixels in a monotonically decreasing mode if the difference between a digital coding of the left-most adjacent pixel and said given image pixel is negative, and if the difference between the digital coding of the right-most adjacent pixel and said given image pixel is negative.

21. The apparatus for digitized image stabilization using energy analysis of claim 18 wherein said difference between said given image pixel's digital coding's absolute value and its two adjacent pixel's digital coding's absolute value is determined for possible digital coding correction, if said difference between said digital coding of said left-most adjacent pixel and said given pixel is less than said pre-determined threshold value, and if said difference between said digital coding of said right-most adjacent pixel and said given pixel is less than said pre-determined threshold value.

22. The apparatus for digitized image stabilization using energy analysis of claim 18 wherein if it has been determined that both a given image pixel's digital coding is not between the digital coding of its 2 adjacent pixels and a difference between given image pixel's digital coding's absolute value and its two adjacent pixel's digital coding is less than a pre-determined threshold value, then said digital coding of said given image pixel is changed to an average of said digital coding of said two adjacent pixels.

23. The apparatus for digitized image stabilization using energy analysis of claim 18 wherein if it has been determined that a given image pixel's digital coding is not between the digital coding of its 2 adjacent pixels, and a difference between given image pixel's digital coding's absolute value and its two adjacent pixel's digital coding is less than a pre-determined threshold value, then the digital coding of said given pixel is not changed and is kept to the original digital coding of said given image pixel.

24. The apparatus for digitized image stabilization using energy analysis of claim 18 wherein said pre-determined threshold value is set to two or three least significant bits, in order to filter out ADC noise.

25. A apparatus for digitized image stabilization using energy analysis noise correction for phase-locked-loops (PLL) comprising:
   means for selecting an odd number, n, consecutive pixel samples which include a given image pixel, (n−1)1/2 consecutive image pixels which are adjacent on the left to said given image pixel, and (n−1)1/2 consecutive image pixels which are adjacent on the right to said given image pixel,
   means for computing the n−1 differences between digital codings of said n consecutive pixel samples,
   means for adding said n−1 differences between said digital codings of said n consecutive pixel samples, to produce a total energy,
   means for choosing a programmable, threshold for the summation of said n−1 differences between said digital codings of said n consecutive pixel samples, means for comparing said total energy to said threshold,
   means for deciding if said total energy is greater than said threshold, and
   means for changing said digital coding of said given image pixel if said energy is greater than said threshold, resulting in a stable image.

26. The apparatus for digitized image stabilization using energy analysis noise correction for phase-locked loops (PLL) of claim 25 wherein said samples are chosen to provide an even number of transitions.

27. The apparatus for digitized image stabilization using energy analysis noise correction for phase-locked loops (PLL) of claim 25 wherein said 'n' consecutive pixel samples are chosen to be five to balance hardware complexity and effectiveness in representing alternating black and white images.

28. The apparatus for digitized image stabilization using energy analysis noise correction for phase-locked loops (PLL) of claim 25 wherein said (n−1) differences between digital codings of said n consecutive pixel samples are computed by subtracting a digital coding of a second pixel from a digital coding of a first pixel and a digital coding of a third pixel from said digital coding of said second pixel, wherein generally a digital coding of an x+1 pixel is subtracted from a digital coding of an x pixel, where x=1, 2, 3, . . . n.

29. The apparatus for digitized image stabilization using energy analysis noise correction for phase-locked loops (PLL) of claim 28 wherein said n−1 differences between said digital codings are added to produce a total energy value.

30. The apparatus for digitized image stabilization using energy analysis noise correction for phase-locked loops (PLL) of claim 25 wherein said programmable threshold is chosen to distinguish smooth low contrast images from high contrast images such as alternating black and white images.

31. The apparatus for digitized image stabilization using energy analysis noise correction for phase-locked loops (PLL) of claim 29 wherein said total energy value is compared to said programmable threshold.

32. The apparatus for digitized image stabilization using energy analysis noise correction for phase-locked loops (PLL) of claim 31 where if said total energy value is greater than said programmable threshold, a "change pixel coding flag is set.

33. The apparatus for digitized image stabilization using energy analysis noise correction for phase-locked loops (PLL) of claim 32 wherein if said change pixel coding flag is set, said digital coding of said given image pixel is changed to a white value if said digital coding of said given image pixel is greater than a white threshold.

34. The apparatus for digitized image stabilization using energy analysis noise correction for phase-locked loops (PLL) of claim 33 wherein if said change pixel coding flag is set, said digital coding of said given image pixel is changed to a black value if said digital coding of said given image pixel is less than said white threshold.

* * * * *